(12) United States Patent
Lal (10) Patent No.: US 11,856,922 B1
(45) Date of Patent: Jan. 2, 2024

(54) PET WASTE DEVICE

(71) Applicant: Narendranath Lal, Allen, TX (US)

(72) Inventor: Narendranath Lal, Allen, TX (US)

(*) Notice: Subject to any disclaimer, the term of this patent is extended or adjusted under 35 U.S.C. 154(b) by 48 days.

(21) Appl. No.: 17/314,188

(22) Filed: May 7, 2021

(51) Int. Cl.
*A01K 23/00* (2006.01)
*A01K 27/00* (2006.01)

(52) U.S. Cl.
CPC ............ *A01K 23/00* (2013.01); *A01K 27/002* (2013.01)

(58) Field of Classification Search
CPC .............................. A01K 23/00; A01K 27/002
See application file for complete search history.

(56) References Cited

U.S. PATENT DOCUMENTS

| | | | |
|---|---|---|---|
| 3,656,459 A * | 4/1972 | Missud | A01K 23/00 119/868 |
| 5,005,525 A | 4/1991 | Stanton | |
| 5,146,874 A | 9/1992 | Vidal | |
| 5,315,960 A * | 5/1994 | Lamp | A01K 23/00 604/353 |
| 5,386,802 A * | 2/1995 | Hang-Fu | A01K 23/00 604/342 |
| 6,394,041 B1 | 5/2002 | Katz | |
| 6,942,264 B1 | 9/2005 | Mendez | |
| 7,461,616 B2 * | 12/2008 | Tsai | A01K 23/00 119/867 |
| 8,342,138 B2 | 1/2013 | Hazan | |
| 8,656,866 B2 | 2/2014 | Moharram | |
| 8,992,495 B1 | 3/2015 | Howell | |
| 10,757,918 B2 | 9/2020 | Stoccardo | |
| 2004/0074450 A1 | 4/2004 | Soares et al. | |
| 2011/0303162 A1 * | 12/2011 | Morman | A01K 23/00 119/858 |
| 2014/0238315 A1 * | 8/2014 | Lee | A01K 23/00 119/868 |
| 2015/0189859 A1 * | 7/2015 | John | A01K 23/00 119/868 |
| 2018/0020642 A1 * | 1/2018 | Nicolas | A01K 23/00 119/868 |
| 2019/0380309 A1 * | 12/2019 | Birchler | A61B 10/007 |
| 2021/0112779 A1 * | 4/2021 | Castro | A01K 23/00 |

* cited by examiner

*Primary Examiner* — Joshua D Huson
*Assistant Examiner* — Alanna K Peterson
(74) *Attorney, Agent, or Firm* — Cramer Patent & Design PLLC; Aaron R. Cramer (57) ABSTRACT

A pet waste device is an octagonal padded ring having a plurality of hooks on the outside of the ring each of which removably retain a pet waste bag. The padded ring may be removably secured to the back of a pet such as a dog.

12 Claims, 7 Drawing Sheets

PET WASTE DEVICE

RELATED APPLICATIONS

Not applicable.

FIELD OF THE INVENTION

The presently disclosed subject matter is directed to a pet waste retrieval and removal device.

BACKGROUND OF THE INVENTION

The act of walking a dog or other pet is a pleasure enjoyed by many pet owners. The ability to get outside and experience nature and the surroundings is a simple joy. There are also the great health benefits associated with exercise for both the dog and the human walker. However, one additional task associated with walking of a dog is the cleaning up of droppings. This act is not only the responsible thing to do, but it is the sanitary thing to do as well. To accomplish this task, many turn to a simple plastic trash bag.

However, such a method suffers from multiple disadvantages such as not being able to completely pick up all droppings, especially if the droppings should fall on gravel or other similar surface. Finally, the user is subject to the squeamish condition of contacting the droppings through the thin plastic. Accordingly, there exists a need for a means by which one can quickly and effectively retrieve dog or pet droppings without the disadvantages as described above. The development of the No Mess Doggy Doo fulfills this need.

SUMMARY OF THE INVENTION

The principles of the present invention provides for a pet waste device which has a harness which in turn has a U-shaped strap which is configured for disposal about a rump of an animal, a bag which has an interior portion and an end rim the strap which includes a base portion, and a connection mechanism which is positioned at the base portion of the strap that is attached to the bag.

The strap may extend along a pair of flanks of the animal. The strap may be configured for disposal below a tail of the animal such that the base portion of the strap is positioned over an anus of the animal. The bag may be configured to surround and hang below the anus of the animal such that the bag is oriented to capture the excrement of the animal. The strap may include a first end and a second end attachable by the connecting mechanism.

The connecting mechanism may be a quick-release buckle for putting on and taking off the harness. The harness may be adjustable to fit various sized animals. A user may detach the bag and discard the pet waste when the animal has completed going to the bathroom. The attachment mechanism may be a drawstring that allows the user to seal the pet waste in the bag and dispose of the bag. The animal may be a dog. The end rim may be attachable with the one or more sections via a corresponding connection mechanism. The end rim may include a plurality of holes which are configured for connection with the attachment mechanism that includes one or more hooks. The attachment mechanism may be disposed within an individual slot on the one or more sections. The bag may include a variety of sizes to accommodate different sized pet waste.

The connection mechanism may include one or more sections that form a periphery about a through hole configured and sized to allow a plurality of pet waste to pass through and into the bag. The attachment mechanism may be selected from the group consisting of one or more clips, one or more hooks, one or more knots, one or more hook-and-loop-type fasteners, one or more integral connection, a friction fit, a pressure fit, a mating engagement, a dovetail connection, one or more barbs, one or more tongue in groove connections, one or more threaded connections, one or more magnetic connections, one or more clamps, one or more spring-loaded clamps, one or more keys, or one or more keyslots. The one or more sections may form an octagon that allows for a wider opening of the bag to capture the pet waste.

The one or more sections may include a cushion material configured to provide padding for a comfortable fit against the rump of the animal. The cushioned material may be made of a material selected from the group of foam, polyester, polyether, polystyrene, polyurethane, polyethylene or vinyl. The one or more sections may form a shape selected from the group consisting of an oval shape, a circular shape, an oblong shape, a triangular shape, a rectangular shape, a polygonal shape, an irregular shape, an uniform shape, a non-uniform shape, a variable shape, or a tapered shape.

BRIEF DESCRIPTION OF THE DRAWINGS

These and other features, aspects, and advantages of the present disclosure will become better understood with regard to the following description, appended claims, and accompanying drawings where:

DESCRIPTIVE KEY 10 pet waste device
12 harness
14 bag
20 strap
24 base portion
26 connection mechanism
28 section
29 slot
30 through hole
32 cushion material
34 attachment mechanism
40 strap
42 first end
44 second end
48 buckle
50 interior portion
52 rim
D animal R rump
F flanks
T tail
A anus
B1 belly
B2 back

DETAILED DESCRIPTION

The following disclosure is provided to describe various embodiments of a pet waste device. Skilled artisans will appreciate additional embodiments and uses of the present invention that extend beyond the examples of this disclosure. Terms included by any claim that may be presented in any yet-to-be-filed non-provisional patent application are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one (1) of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

Various aspects of the present disclosure will now be described in detail, without limitation. In the following disclosure, a pet waste device configured to capture pet waste as the animal is in the process of elimination will be discussed. The pet waste device is configured to provide a mess free system of disposing of pet excrement. Skilled readers should not view the inclusion of any alternative labels as limiting in any way.

Referring now to FIGS. 1-7, an illustrative pet waste device 10 will now be discussed in more detail. Pet waste device 10 includes an attachment device, for example, a harness 12 and a capturing device, for example, a bag 14, as described herein.

Figure 1:
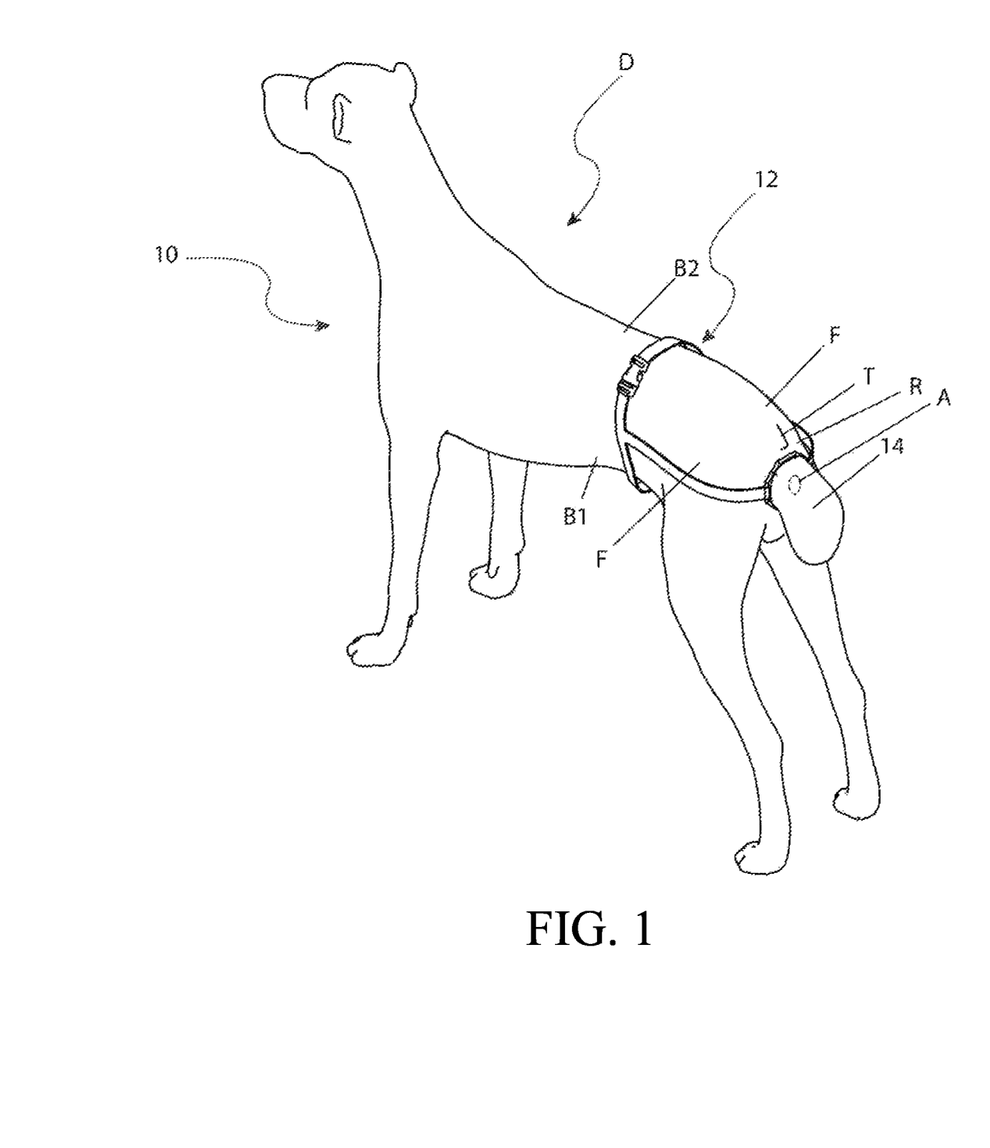
FIG. 1 is a perspective view of a pet waste device attached to an animal D, according to an embodiment of this disclosure.
Figure 2:
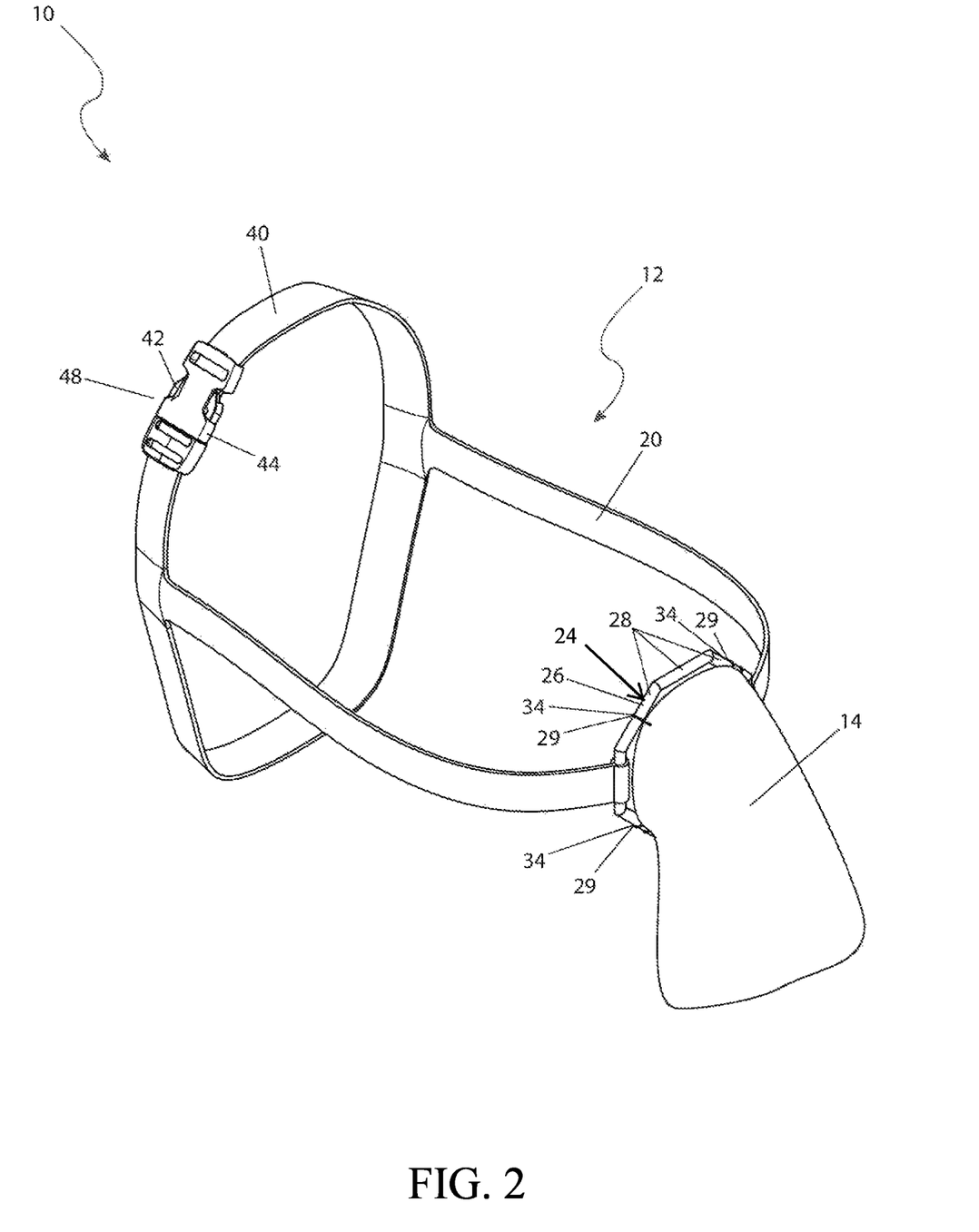
FIG. 2 is a perspective view of a pet waste device, according to an embodiment of this disclosure.
Figure 3:
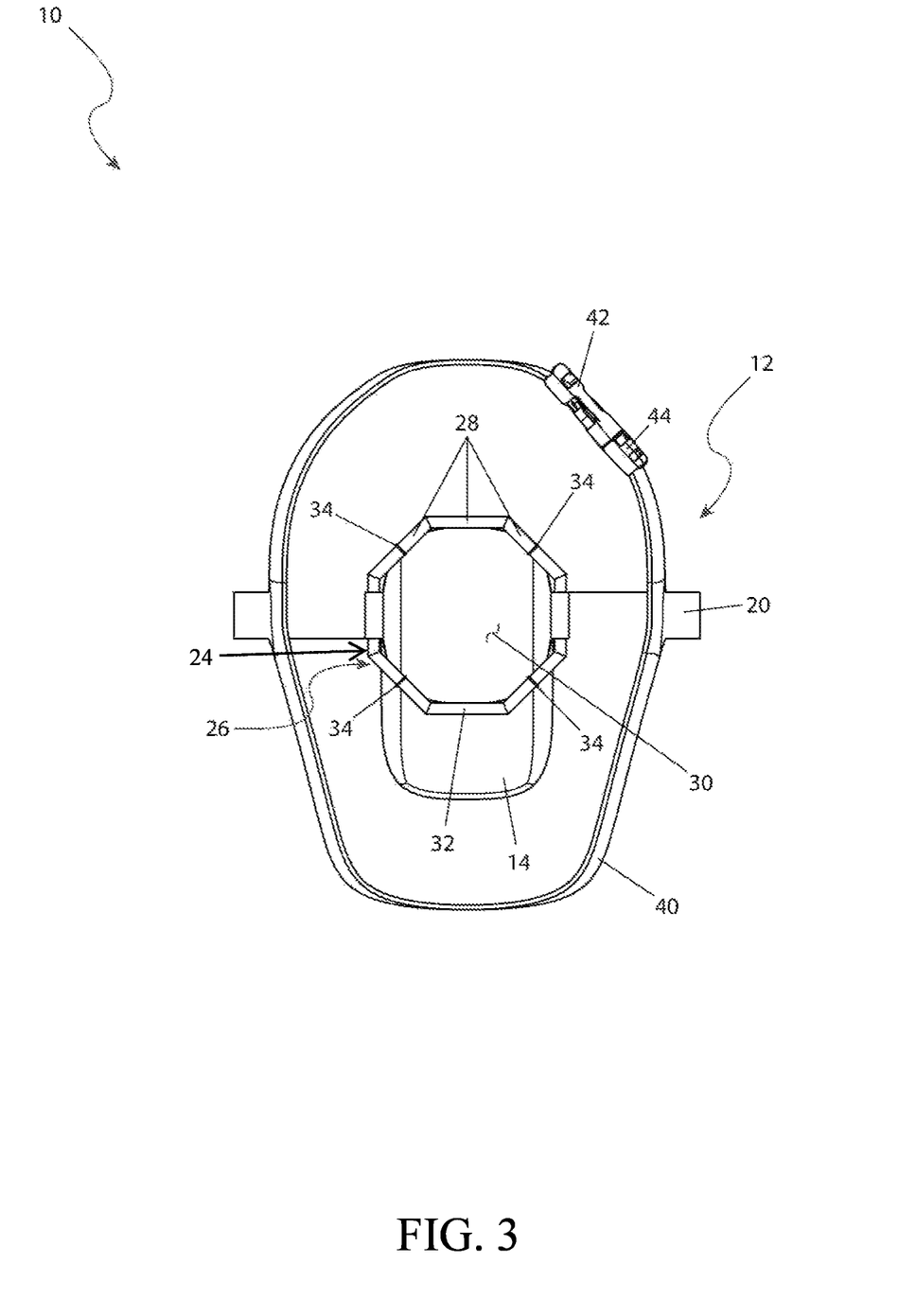
FIG. 3 is a front view of a pet waste device, according to an embodiment of this disclosure.
Figure 4:
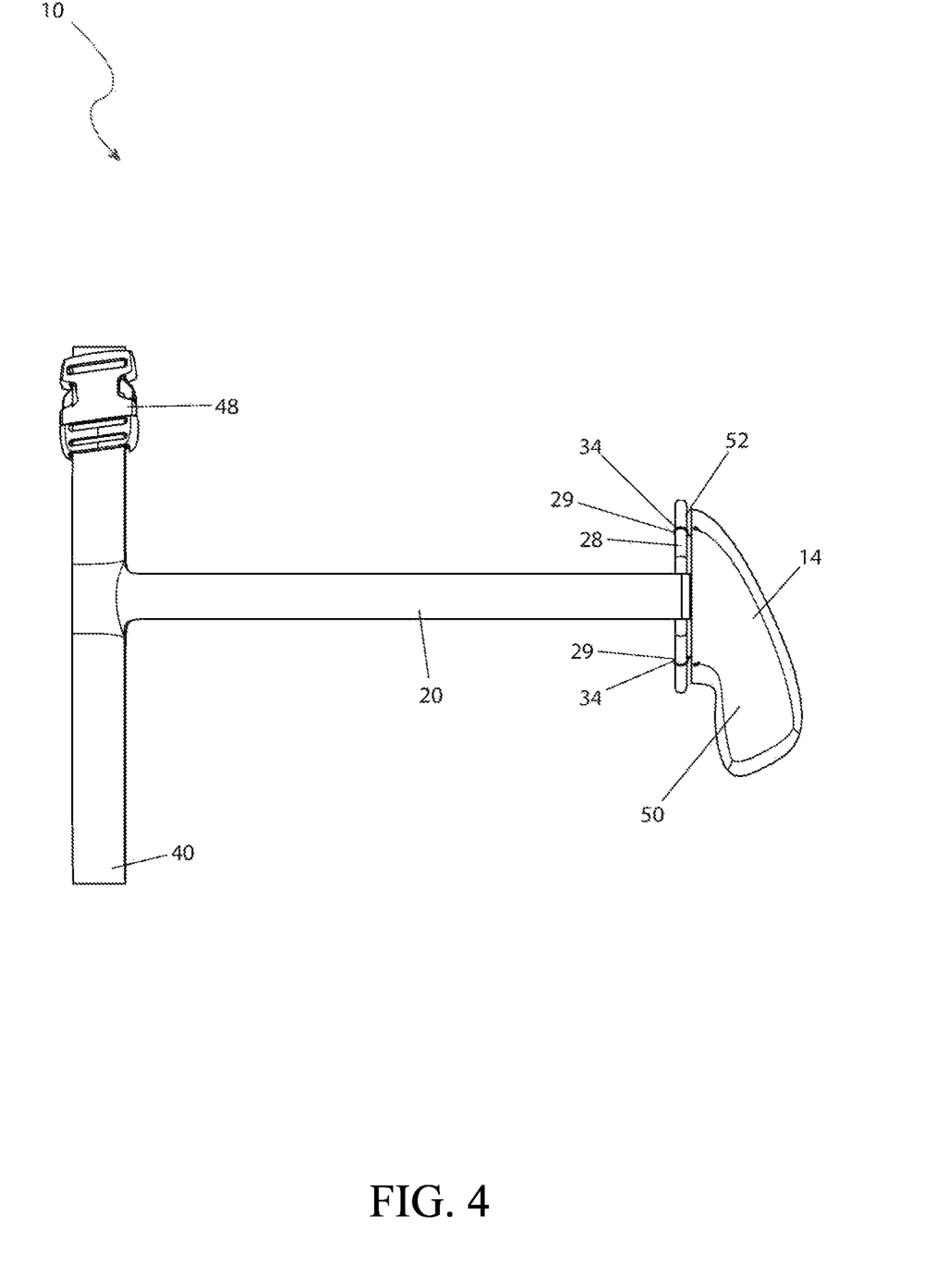
FIG. 4 is a side view of a pet waste device, according to an embodiment of this disclosure.
Figure 5:
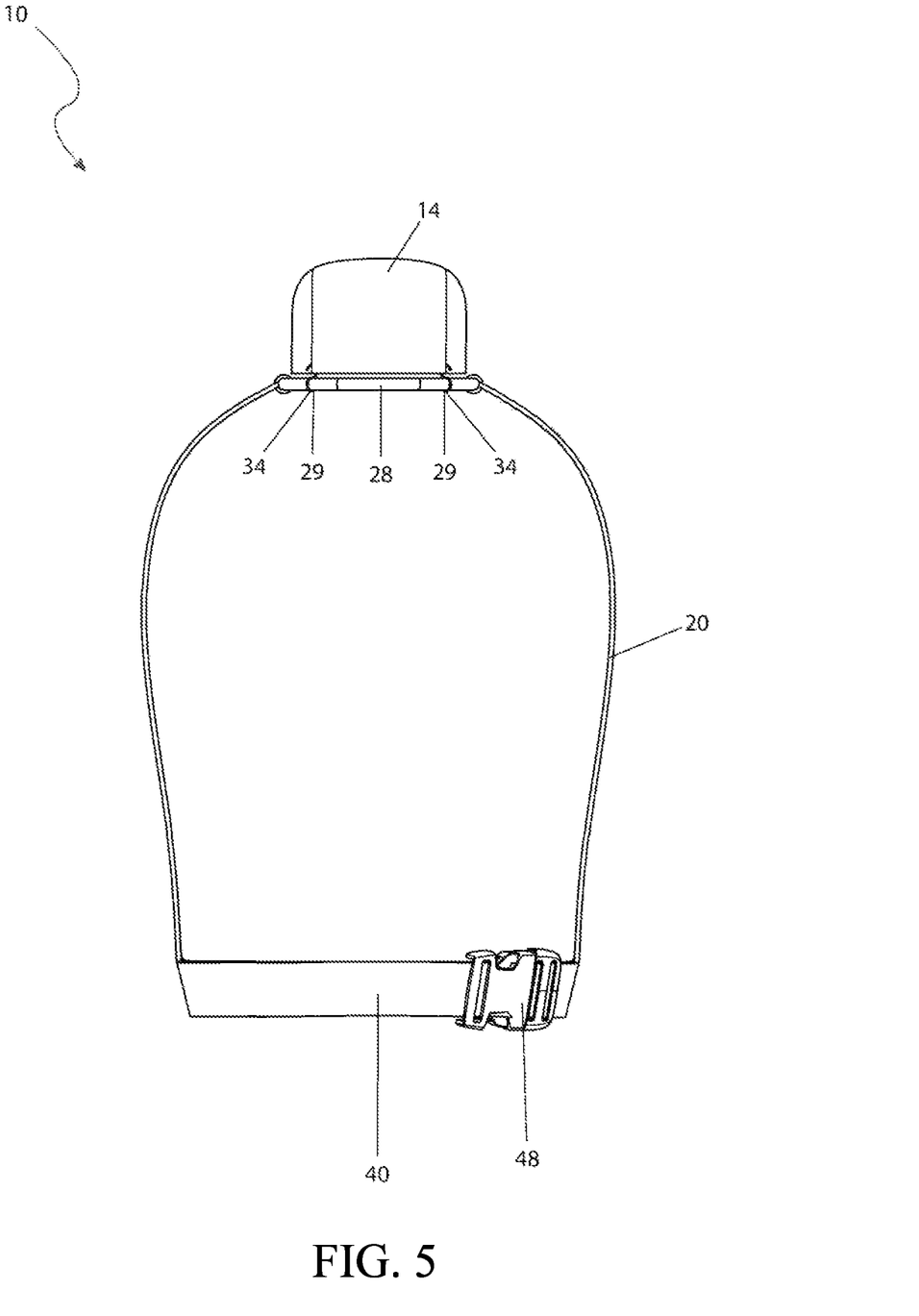
FIG. 5 is a top view of a pet waste device, according to an embodiment of this disclosure.
Figure 6:
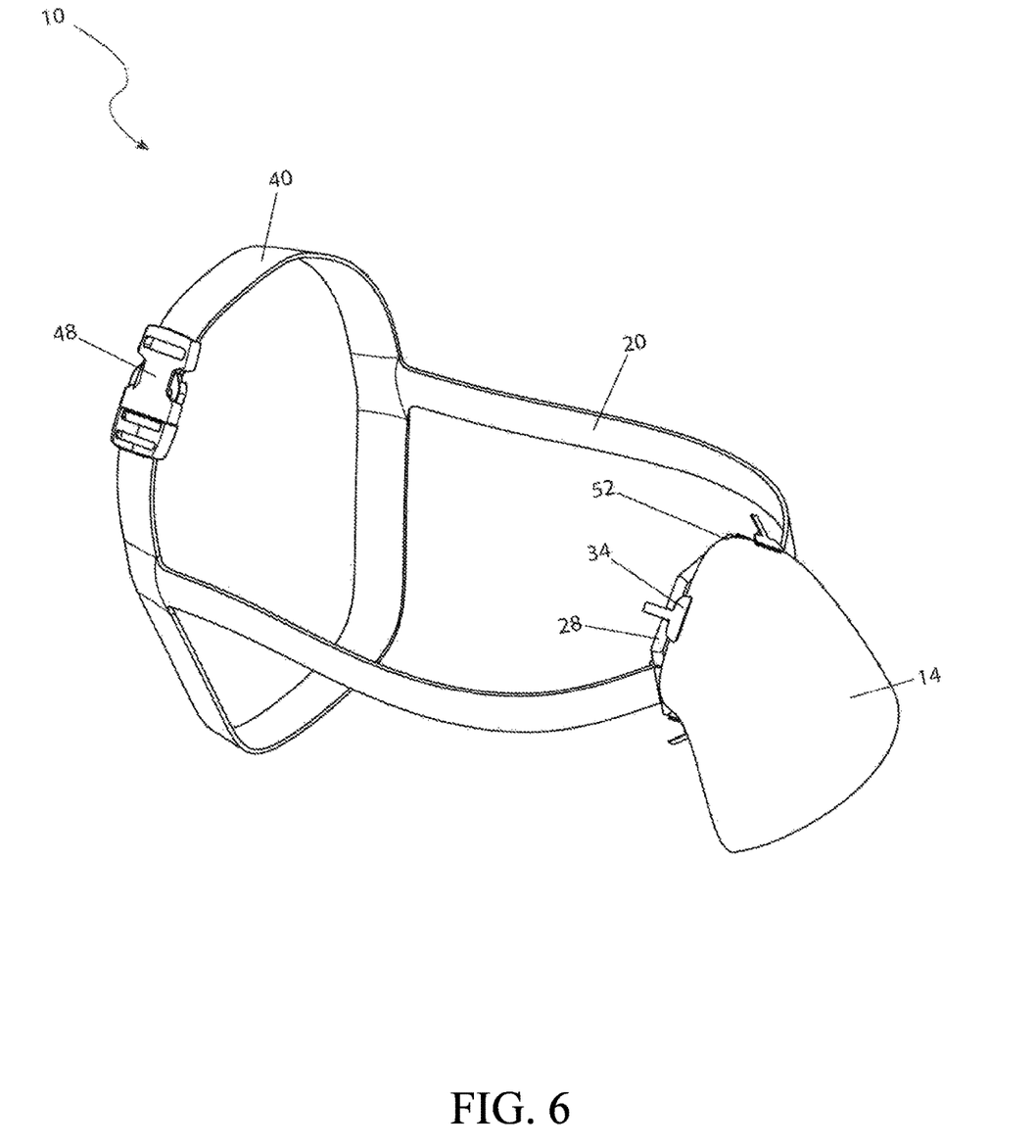
FIG. 6 is a perspective view of a pet waste device, according to an embodiment of this disclosure.

Harness 12 includes a "U"-shaped strap 20 configured for disposal about a rump R of animal D, for example, a dog, as shown in FIG. 1. Strap 20 extends along both flanks F of animal D. Strap 20 is configured for disposal below a tail T of animal D such that a base portion 24 of strap 20 is positioned over an anus A of animal D. Positioned at base portion 24 is a connection mechanism 26. Connection mechanism 26 is configured for attachment with bag 14. In some embodiments, connection mechanism 26 includes one (1) or a plurality of sections 28 that form a periphery about a through hole 30, as shown in FIG. 3. Through hole 30 is configured and sized to allow pet waste to pass through and into bag 14.

In one (1) embodiment, sections 28 form an octagon, as shown in FIG. 3. The octagon shape allows for a wide opening of bag 14 to capture the pet waste. In some embodiments, the sections 28 may form various shapes, for example, oval, circular, oblong, triangular, rectangular, polygonal, irregular, uniform, non-uniform, variable, and/or tapered.

In some embodiments, sections 28 include a cushion material 32 configured to provide a padding for a comfortable fit against rump R of animal D. In some embodiments, cushion material 32 may include, for example, foam, polyester, polyether, polystyrene, polyurethane, polyethylene or vinyl.

The sections 28 include an attachment mechanism 34 configured to attach bag 14 to sections 28. In some embodiments, attachment mechanism 34 may include clips, hooks, knots, hook-and-loop-type fasteners, integral connection, friction fit, pressure fit, mating engagement, dovetail connection, barbs, tongue in groove, threaded, magnetic, clamp, spring-loaded clamp and/or key/keyslot.

Harness 12 is attached to animal D via a strap 40. Strap 40 is integrally connected with strap 20 or attachable with strap 20. Strap 40 is configured for disposal about a belly B1 and back B2 of animal D, as shown in FIG. 1. In some embodiments, if animal D is male, strap 40 would be positioned a distance from the genitals of the animal D to not hinder urination. Strap 40 includes first and second ends 42, 44 attachable by a connecting mechanism, for example, a quick-release buckle 48. Buckle 48 allows for putting on and taking off harness 12.

Bag 14 includes an interior portion 50 and an end rim 52. Rim 52 is attachable with sections 28 via a corresponding connection mechanism as described herein. For example, rim 52 may include holes configured for connection with such attachment mechanism 34 that may be embodied as hooks, each individual attachment mechanism 34 disposed within an individual slot 29 on sections 28. Rim 52 includes a closure mechanism, for example, a drawstring. This allows for a user to seal the pet waste in bag 14 and dispose of bag 14. Interior portion 50 is configured to capture and contain the pet waste therein.

Pet waste device 10 is provided in various sizes for various sized animals D. In some embodiments, harness 12 is adjustable to fit various sized animals D. In some embodiments, bag 14 includes various sizes to adjust for larger sized pet waste.

Figure 7:
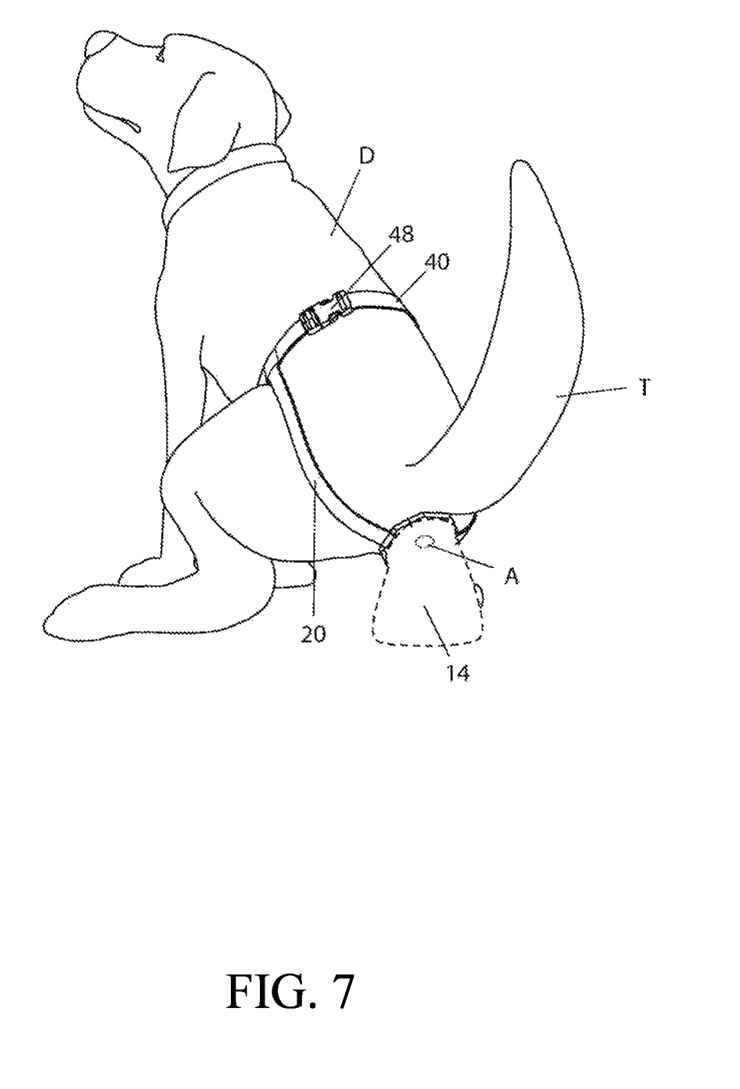
FIG. 7 is a perspective view of a pet waste device attached to an animal D, according to an embodiment of this disclosure.

In operation, as shown in FIGS. 1 and 7, bag 14 is attached with sections 28, as described herein. Harness 12 is attached to animal D such that through hole 30 is aligned with anus A of animal D. Strap 40 is fastened, as described herein. When a user is walking animal D, when animal D has to go to the bathroom, animal D typically squats, as shown in FIG. 7. Bag 14 is configured to surround and hang below anus A of animal D such that bag 14 is oriented to capture the excrement of animal D. When animal D has completed going to the bath, the user can detach bag 14 and discard appropriately.

While various aspects of the present invention have been described in the above disclosure, the description of this disclosure is intended to illustrate and not limit the scope of the invention. The invention is defined by the scope of the claims of a corresponding nonprovisional utility patent application and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the claims of a corresponding nonprovisional utility patent application.

The invention claimed is:
1. A pet waste device, consisting of:
   a harness having a U-shaped strap configured for disposal about a rump of an animal, the U-shaped strap includes a base portion;
   a bag having an interior portion and an end rim;
   a connection mechanism positioned at the base portion of the U-shaped strap that is attached to the bag; and
   an attachment mechanism allowing a user to seal a plurality of pet waste in the bag and dispose of the bag;

wherein the U-shaped strap extends along a pair of flanks of the animal;

wherein the U-shaped strap is configured for disposal below a tail of the animal such that the base portion of the U-shaped strap is positioned over an anus of the animal;

wherein the connection mechanism is a quick-release buckle for putting on and taking off the harness;

wherein the harness is adjustable to fit various sized animals;

wherein the end rim is attachable with one or more sections of the connection mechanism;

wherein the end rim includes a plurality of holes configured for connection with the attachment mechanism that includes one or more hooks; and wherein the one or more sections of the connection mechanism form an octagon that facilitates capturing the pet waste.

2. The pet waste device, according to claim 1, wherein the bag is configured to surround and hang below the anus of the animal such that the bag is oriented to capture a plurality of excrement of the animal.

3. The pet waste device, according to claim 1, wherein the user detaches the bag and discards the pet waste when the animal has completed urinating and/or defecating.

4. The pet waste device, according to claim 1, wherein the attachment mechanism is a drawstring.

5. The pet waste device, according to claim 1, wherein the animal is a dog.

6. The pet waste device, according to claim 1, wherein the attachment mechanism is disposed within an individual slot on the one or more sections of the connection mechanism.

7. The pet waste device, according to claim 1, wherein the bag includes a variety of sizes to accommodate a plurality of different sizes of the pet waste.

8. The pet waste device, according to claim 1, wherein the connection mechanism includes the one or more sections that form a periphery about a through hole configured and sized to allow the pet waste to pass through and into the bag.

9. The pet waste device, according to claim 1, wherein the attachment mechanism is selected from the group consisting of one or more clips, one or more hooks, one or more knots, one or more hook-and-loop-type fasteners, one or more integral connection, one or more barbs, one or more tongue in groove connections, one or more threaded connections, one or more magnetic connections, one or more clamps, one or more spring-loaded clamps, one or more keys, or one or more key slots.

10. The pet waste device, according to claim 1, wherein the one or more sections of the connection mechanism include a cushion material configured to provide padding for a comfortable fit against the rump of the animal.

11. The pet waste device, according to claim 10, wherein the cushioned material is made of a material selected from the group of polyester, polyether, polystyrene, polyurethane, polyethylene, or vinyl.

12. The pet waste device, according to claim 1, wherein the one or more sections of the connection mechanism form a shape selected from the group consisting of an oval shape, a circular shape, an oblong shape, a triangular shape, a rectangular shape, or a polygonal shape.

* * * * *